US010879997B2

(12) United States Patent
Saxena et al.

(10) Patent No.: US 10,879,997 B2
(45) Date of Patent: Dec. 29, 2020

(54) SYSTEM AND METHOD FOR BI-DIRECTIONAL COMMUNICATION OF DATA BETWEEN SERVERS ON-BOARD AND OFF-BOARD A VEHICLE

(71) Applicant: Honeywell International Inc., Morris Plains, NJ (US)

(72) Inventors: Sunit Kumar Saxena, Bangalore (IN); George Rajan Koilpillai, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 15/974,431

(22) Filed: May 8, 2018

(65) Prior Publication Data
US 2019/0349071 A1    Nov. 14, 2019

(51) Int. Cl.
*H04B 7/185* (2006.01)
*H04W 4/40* (2018.01)
(Continued)

(52) U.S. Cl.
CPC ....... *H04B 7/18506* (2013.01); *G08G 5/0013* (2013.01); *H01Q 1/44* (2013.01); *H04W 4/40* (2018.02)

(58) Field of Classification Search
CPC ... H04B 7/18506; G08G 5/0013; H04W 4/40; H04W 4/44; H04W 4/80; H01Q 1/44; H01Q 1/282; H01Q 21/29
See application file for complete search history.

(56) References Cited

U.S. PATENT DOCUMENTS 5,918,183 A * 6/1999 Janky ................. H01Q 1/32
455/282
6,400,308 B1 * 6/2002 Bell ................... H01Q 1/3233
342/71
(Continued)

FOREIGN PATENT DOCUMENTS

EP      1478106 B1    3/2017
WO   2002079918 A2   10/2002

OTHER PUBLICATIONS

Honeywell Aerospace, "DL-1000 Wireless Solution for Legacy Cockpits", https://aerospace.honeywell.com/en/products/cockpit-systems/dl-1000-wireless-solution, Downloaded: May 8, 2018, pp. 1-4, Publisher: Honeywell International Inc.
(Continued)

*Primary Examiner* — Gregory B Sefcheck
*Assistant Examiner* — Joshua Smith
(74) *Attorney, Agent, or Firm* — Bookoff McAndrews, PLLC

(57) ABSTRACT

A system for transferring data between an on-board server and an off-board server of a vehicle is provided. The system comprises: a light mounted to an exterior of a vehicle; an external network comprising an external wireless access point comprising a first antenna positioned on the exterior of the vehicle at the location of the light, the external network configured to automatically connect to an off-board server, the off-board server located outside the vehicle; an internal network comprising internal wireless access point comprising a second antenna, the second antenna positioned on the interior of the vehicle at the location of the light, the internal network configured to automatically connect to an on-board server, the on-board server internal to the vehicle; and a circuit coupled to the external access point and to the internal access point, the circuit configured to transfer data (Continued)

Figure 1:
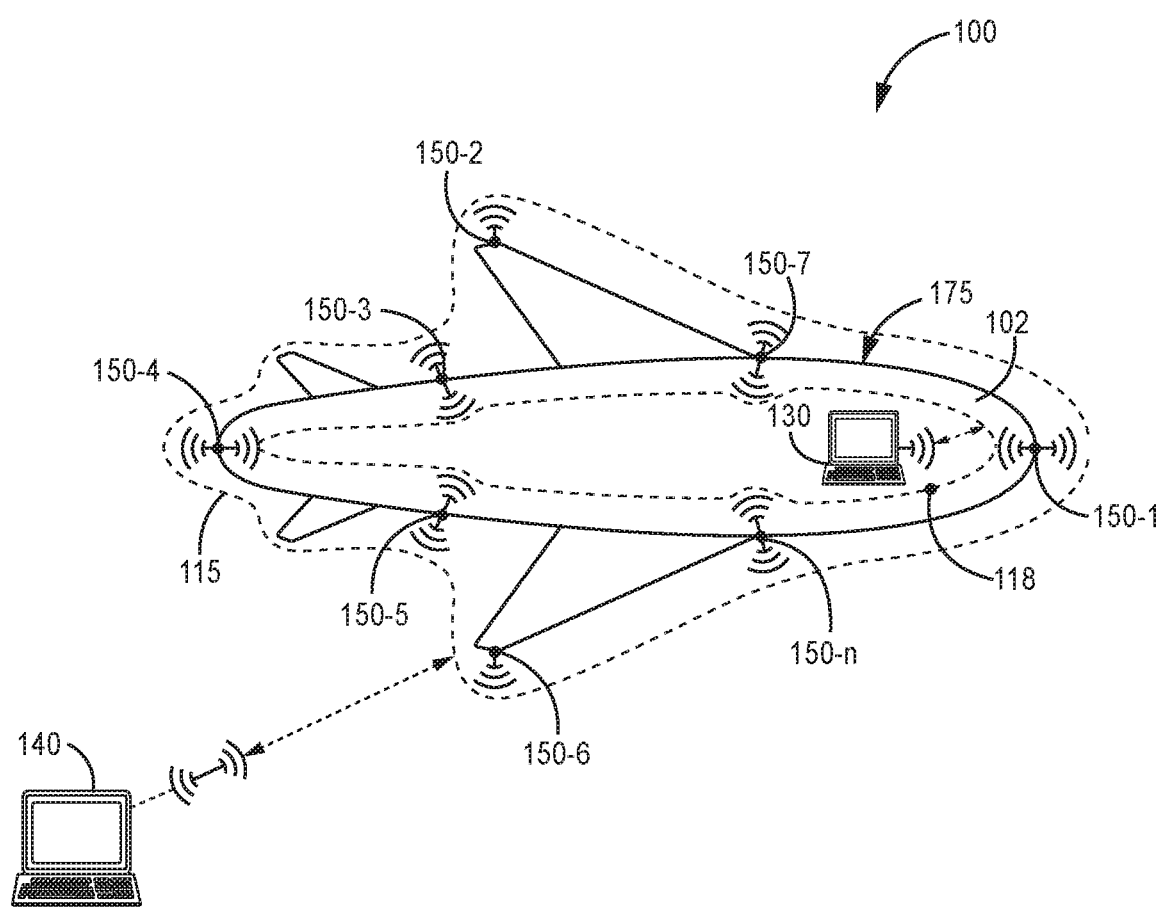

bi-directionally between the off-board server and the on-board server.

9 Claims, 5 Drawing Sheets

(51) Int. Cl.
*H01Q 1/44* (2006.01)
*G08G 5/00* (2006.01)

(56) References Cited

U.S. PATENT DOCUMENTS

| | | | |
|---|---|---|---|
| 7,769,376 B2 | 8/2010 | Wright et al. | |
| 9,184,497 B2 | 11/2015 | Chen et al. | |
| 9,894,492 B1* | 2/2018 | Elangovan | H04W 12/08 |
| 2002/0111720 A1 | 8/2002 | Holst et al. | |
| 2003/0076785 A1* | 4/2003 | Purpura | H04W 28/18 |
| | | | 370/252 |
| 2005/0202785 A1* | 9/2005 | Meyer | H04B 7/18506 |
| | | | 455/66.1 |
| 2006/0270354 A1 | 11/2006 | Chapelle et al. | |
| 2007/0027589 A1* | 2/2007 | Brinkley | G08G 5/0013 |
| | | | 701/3 |
| 2009/0100476 A1* | 4/2009 | Frisco | H04B 7/18508 |
| | | | 725/68 |
| 2009/0322628 A1* | 12/2009 | Palmer | H01Q 1/12 |
| | | | 343/702 |
| 2015/0259078 A1* | 9/2015 | Filipovic | H04W 88/08 |
| | | | 244/114 R |
| 2015/0280316 A1* | 10/2015 | Iso | H01Q 1/06 |
| | | | 343/713 |
| 2016/0050013 A1* | 2/2016 | Brownjohn | H04B 7/18508 |
| | | | 370/316 |
| 2016/0205724 A1 | 7/2016 | Shi | |
| 2017/0099686 A1* | 4/2017 | Green | H04W 4/44 |
| 2017/0311423 A1 | 10/2017 | Clark et al. | |
| 2017/0327079 A1* | 11/2017 | Grossmann | H04W 4/40 |
| 2018/0006365 A1* | 1/2018 | Powell | H01Q 1/3283 |
| 2018/0049005 A1* | 2/2018 | Still | H04W 4/021 |
| 2018/0213355 A1* | 7/2018 | Smith | H04W 84/18 |

OTHER PUBLICATIONS

Honeywell Aerospace, "DL-950 Data Loader", aerospace.honeywell.com/gyroscopes, Jul. 2015, pp. 1-2, Publisher: Honeywell International Inc.

* cited by examiner

SYSTEM AND METHOD FOR BI-DIRECTIONAL COMMUNICATION OF DATA BETWEEN SERVERS ON-BOARD AND OFF-BOARD A VEHICLE

BACKGROUND

A navigation function of an avionics system that provides flight plan navigation, approach and landing guidance functions requires up to date airfield and waypoint database and notice-to-airmen (NOTAM). Thus, aircraft operators are required to update this database every 28 days to make sure it contains current information. To meet this regulatory requirement, aircraft operators periodically update the databases of their aircraft through a data loader.

Conventional systems use data transfer methods that are manually intensive, laborious and slow. For example, advanced data loading techniques result in data loaders like the DL-1000, commercially available from Honeywell International Inc., that are capable of connecting to nearby computers (in very close proximity) wirelessly to enable data and software loading. Further, predictive, break-down maintenance require aircraft data to be downloaded from Condition Based Maintenance (CBM) to the ground station. Data gets transferred to a ground computer either through a wired connection (Ethernet) or a wireless connection (WiFi, Bluetooth, LTE or other cellular technology) to the Data LAN management unit (DLMU) unit. Further still, in conventional systems, an aircraft entertainment system requires a large volume of digitized entertainment data to be uploaded to the Cabin Management System (CMS) from ground equipment. Typically, data gets uploaded to the CMS from the ground computers through a wired connection.

However, such conventional data transfer solutions require a handheld device to be physically carried in proximity to the aircraft to physically or wirelessly connect the data loader unit with a ground computer. There are chances of manual errors when carrying the database in a USB or floppy. Further, these conventional data transfer solutions may result in a delay in loading the current database into the avionics of an aircraft.

For the reasons stated above and for other reasons stated below, it will become apparent to those skilled in the art upon reading and understanding the specification, there is a need in the art for a technique or system for transferring data between the avionics of an aircraft and an off-board server that is faster, easier and more reliable.

SUMMARY

A system for transferring data between an on-board server and an off-board server of a vehicle is provided. The system comprises at least one light mounted to an exterior of a vehicle. The system further comprises an external network comprising at least one external wireless access point, wherein the at least one external wireless access point comprises a first antenna, and wherein the first antenna is positioned on the exterior of the vehicle at the location of the at least one light, wherein the external network is configured to automatically connect to an off-board server, wherein the off-board server is located outside the vehicle. The system also comprises an internal network comprising at least one internal wireless access point, wherein the at least one internal wireless access point comprises a second antenna, and wherein the second antenna is positioned on the interior of the vehicle at the location of the at least one light, wherein the internal network is configured to automatically connect to an on-board server, wherein the on-board server is internal to the vehicle. Finally, the system comprises a circuit coupled to the at least one external wireless access point and to the at least one internal wireless access point, wherein the circuit is configured to transfer data bi-directionally between the off-board server and the on-board server.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 describes an exemplary embodiment of a wireless connection system.

Figure 2:
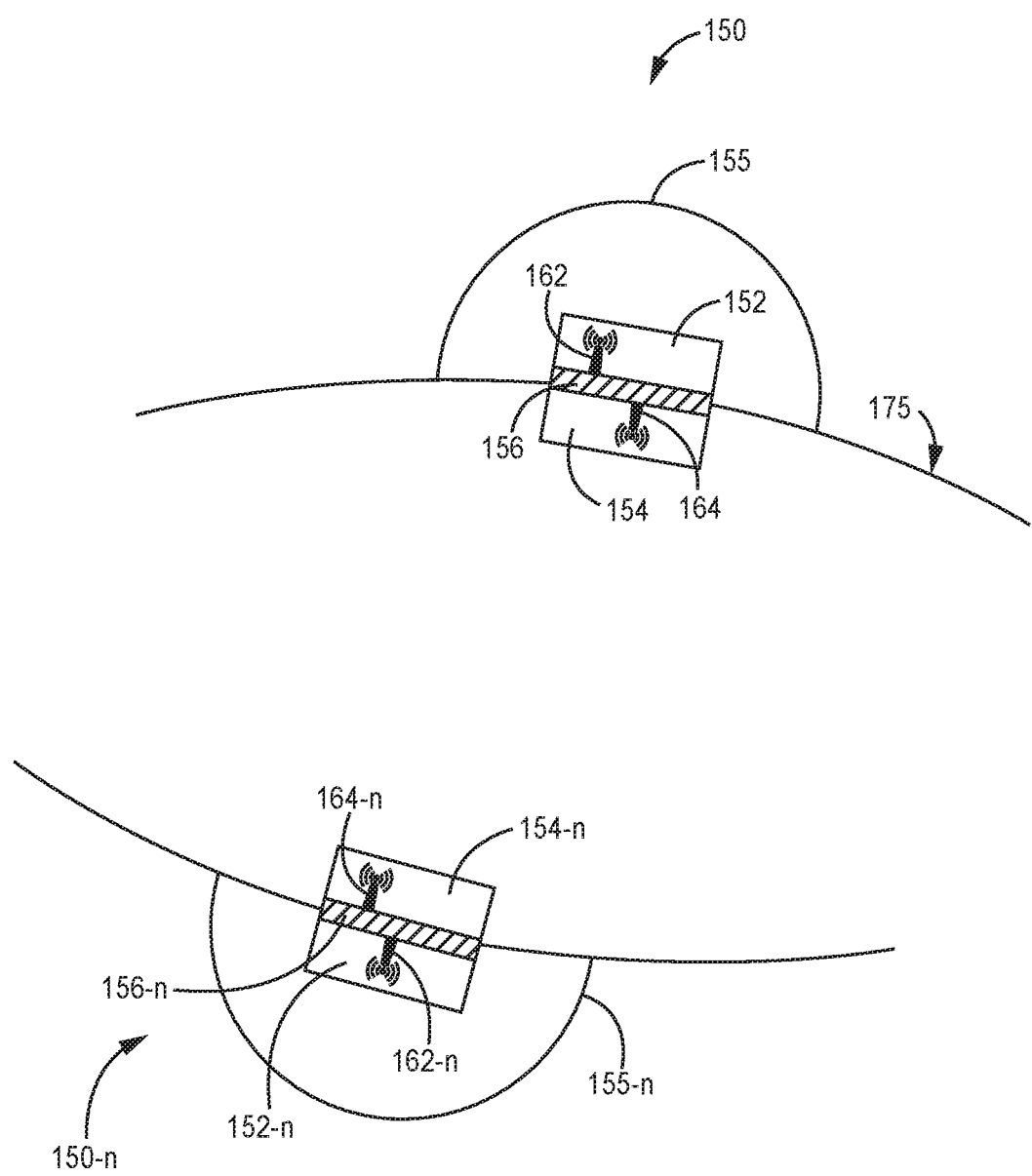

FIG. 2 describes an exemplary embodiments of location of a light in an exemplary wireless connection system of FIG. 1.

Figure 3:
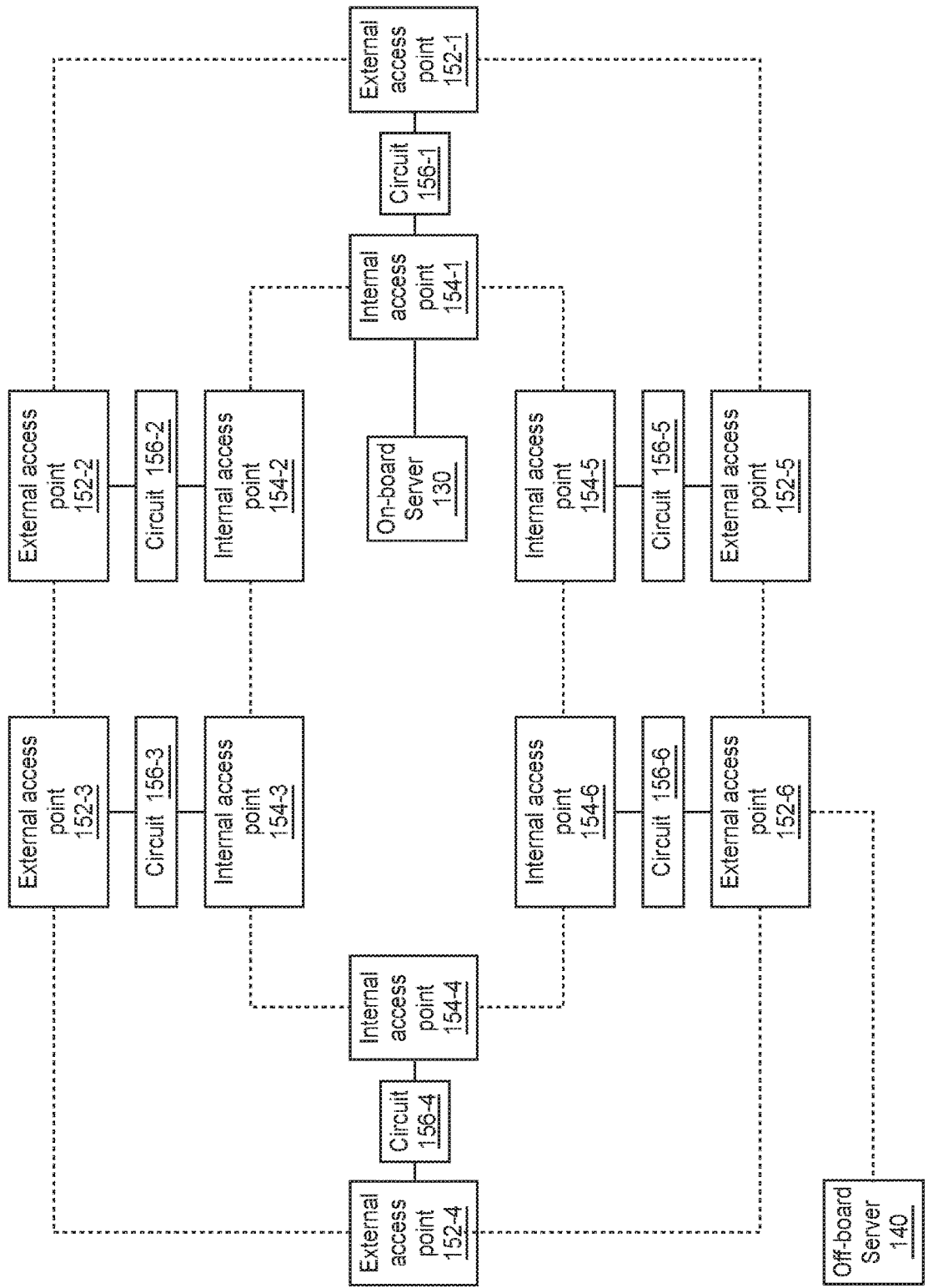

FIG. 3 describes data transfer between an on-board server and an off-board server in an exemplary wireless connection system of FIG. 1.

Figure 4:
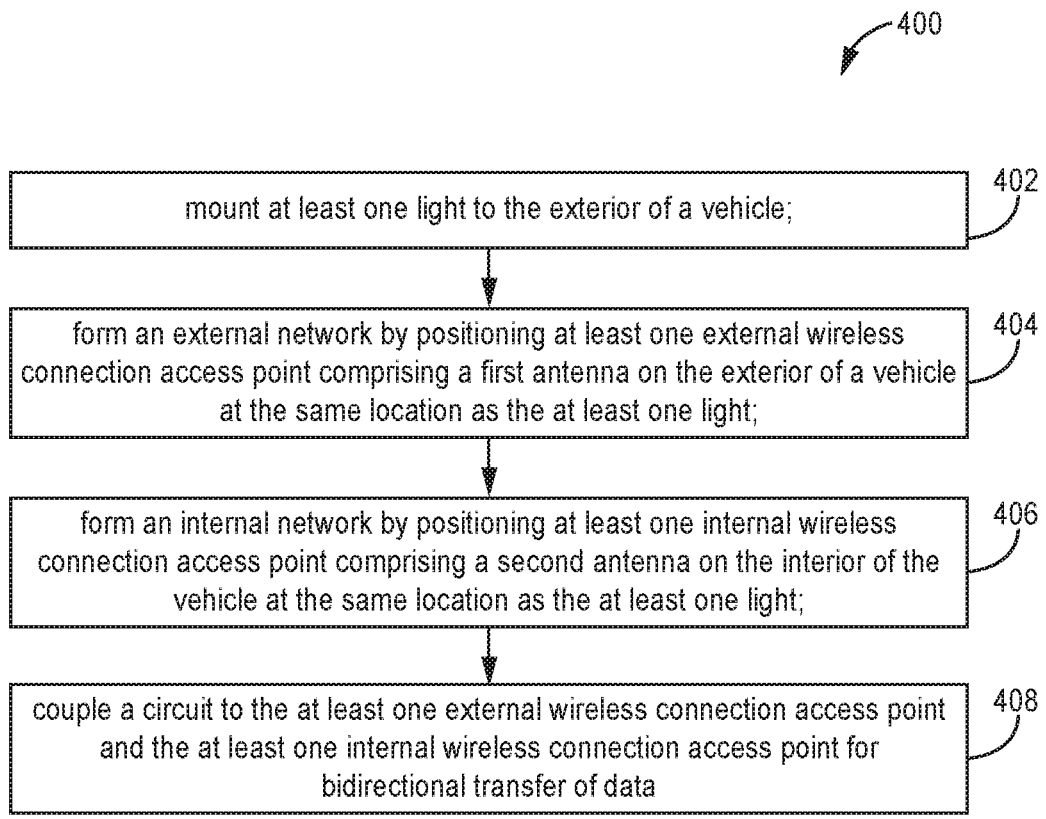

FIG. 4 describes a flow diagram for providing a wireless connection system.

Figure 5:
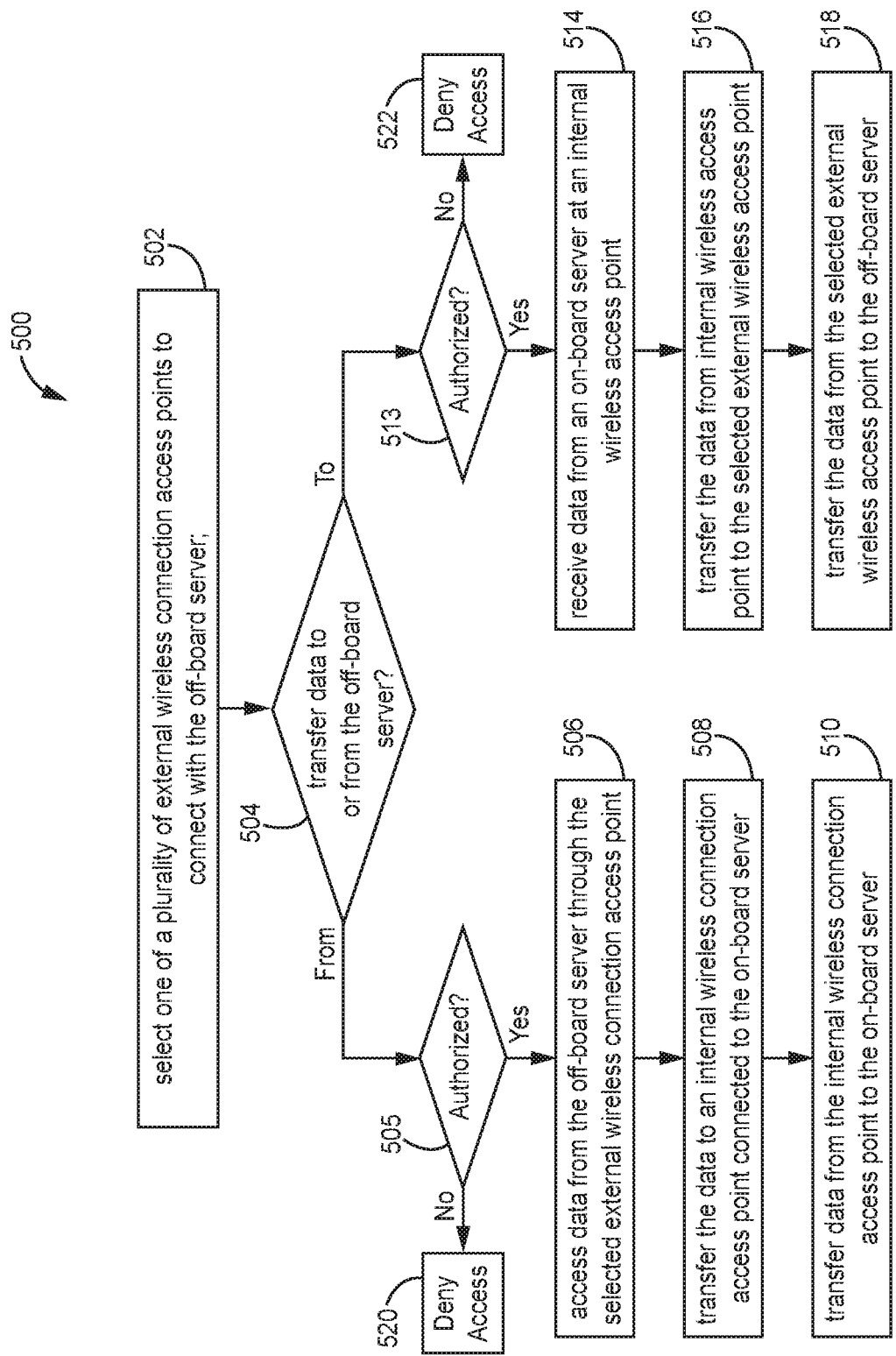

FIG. 5 describes a flow diagram for transferring data between an on-board server of a vehicle and an off-board server.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods to establish a wireless network that envelops a vehicle to enable automatic connection to a network of an off-board server to transfer data between the off-board server and an on-board server of the vehicle. For example, when an aircraft reaches an airport terminal or a maintenance hangar, an update to the software of the on-board server may be needed. Because the Wi-Fi range is limited (to up to 10 meters), conventional systems require uploading data on a handheld device and then manually carrying a handheld device closer to the on-board server to establish connection between the handheld device and the on-board server to transfer data to the on-board server. Accordingly, embodiments described herein provide a wireless network that envelops the vehicle, thereby extending the reach of the network of the on-board server and enabling automatic connection of an off-board server with an on-board server. With this automatic connection, smooth transfer of data between the on-board server and the off-board server is enabled.

FIG. 1 describes an exemplary embodiment of system 100 that enables transfer of data between an on-board server of a vehicle and an off-board server. System 100 includes at least one light 150 mounted on vehicle 102. System 100 further includes an external wireless network 115 configured to connect to an off-board server 140. In exemplary embodiments, off-board server 140 is a ground station, e.g., a server located at or in communication with an access point at an airport. System 100 further includes an internal wireless network 118 configured to connect to an on-board server 130. In exemplary embodiments, on-board server 130 is at least one of a DLMU and a Cabin Gateway (CG). In the example shown in FIG. 1, vehicle 102 is an aircraft. In other exemplary embodiments, the vehicle may be another type of vehicle such as a ship, train, bus, rocket, etc. In exemplary embodiments, network 100 includes a plurality of lights 150-1 to 150-n mounted to vehicle 102. As shown in FIG. 1, light(s) 150 are mounted to an exterior surface 175 of vehicle 102.

FIG. 2 describes the location of an exemplary light 150 of system 100 in further detail. As showed in FIG. 2, light 150 of system 100 includes a non-metallic cover element 155 mounted to the vehicle 102 at surface 175, an external wireless access point 152 at the location of light 150 attached to an exterior of the vehicle 102, and an internal wireless access point 154 attached to an interior of the vehicle 102. In exemplary embodiments, the non-metallic cover element 155 is composed of glass or polycarbonate material.

External wireless access point 152 including an antenna 162, and internal wireless access point 154 including antenna 164, are connected to a circuit 156. Circuit 156 enables bidirectional transfer of data between external wireless access point 152 and internal wireless access point 154. In exemplary embodiments, circuit 156 is a shared memory. In such an exemplary embodiment, external wireless access point 152 and internal wireless access point 154 are both able to read into the data. In other exemplary embodiments, circuit 156 is a serial link that is able to transfer data bi-directionally between external wireless access point 152 and internal wireless access point 154.

As shown in FIG. 2, in an exemplary embodiment wherein system 100 includes a plurality of lights 150-1 to 150-n, each of the plurality of lights 150-n is accompanied with a non-metallic light element 155-n, an external wireless access point 152-n including an antenna 162-n, an internal wireless access point 154-n including antenna 164-n, and a circuit 156-n connected to external wireless access point 152-n and internal wireless access point 154-n to provide bidirectional transfer of data. By including the external wireless access point 152, internal wireless access point 154 and circuit 156 in location of light(s) 150, fabrication of additional holes to accommodate a network around the vehicle (for example, an aircraft) is eliminated.

Each external wireless access point 152 includes an antenna 162 having capability to connect wirelessly to an off-board server (such as off-board server 140 of FIG. 1). Similarly, each internal wireless access point 154 includes an antenna 164 having capability to connect wirelessly to an on-board server (such as on-board server 130 of FIG. 1). In exemplary embodiments, both external wireless access point 152 and internal wireless access point 154 have Wi-Fi, Bluetooth, Zigbee or other proprietary or non-proprietary wireless communication capabilities or protocols. Each external wireless access point 152 and each internal wireless access point 154 has an individual service set identifier (SSID).

Referring back to FIG. 1, system 100 further includes an external network 115 configured to automatically connect to an off-board server 140. One or more external wireless access points 152 (showed in FIG. 2) at locations of light(s) 150 form the external network 115. As described in FIG. 2, each external wireless access point 152 includes capability to connect to an off-board server 140. In one embodiment of the present invention, each external wireless access point 152 has an individual SSID. This enables the off-board server 140 to locate the SSID of the external wireless access point 152 that provides the strongest signal. The off-board server 140 is thus able to connect to that particular external wireless access point. By placing external wireless access points 152 at various points around the vehicle, external network 115 casts a larger footprint and makes it easier for the off-board server to connect to the on-board server of the vehicle.

Every external wireless access point 152 attempts to connect with the off-board server 140. However, only the external wireless access points 152 in close proximity and within range of the off-board server 140 are able to establish connection with the off-board server 140. Each of these connected external wireless access points 152 share the status and quality of wireless connection (for example, signal strength) with the remaining connected external wireless access points 152 and with the off-board server 140. The off-board server 140 then selects one of the connected external wireless access points 152 for data transfer based on status and quality of wireless connection.

For example, in the examples shown in FIGS. 1-3, lights 150-4, 150-5 and 150-6 are in close proximity and within range of off-board server 140. Accordingly, external wireless access points 152-4, 152-5 and 152-6 corresponding to lights 150-4, 150-5 and 150-6 respectively establish connection with off-board server 140. Each of the external wireless access point 152 corresponding to lights 150-4, 150-5 and 150-6 then share the status and quality of wireless connection with the off-board server 140. Because light 150-6 is in closest proximity to off-board server 140, external wireless access point 152 corresponding to light 150-6 may have stronger signal strength than other external wireless access points 152 and external wireless access point 152-6 corresponding to light 150-6 is selected for data transfer with off-board server 140. In exemplary embodiments, each of the external wireless access points 152 corresponding to lights 150-4, 150-5 and 150-6 share the status and quality of wireless connection with the remaining two external wireless access points 152.

System 100 further includes an internal wireless network 118 configured to automatically connect to an on-board server 130. One or more internal wireless access points 154 (shown in FIG. 2) at locations of light(s) 150 form the internal wireless network 118. The location of the on-board server 130 and the location of internal wireless access points 154 is fixed. Accordingly, the internal wireless access point 154 selected to establish connection with the on-board server 130 remains unchanged. For example, in the example shown in FIG. 1, internal wireless access point 154 corresponding to light 150-1 establishes connection with the on-board server 130 and is used for data transfer between on-board server 130 and internal wireless network 118.

After a connected external wireless access point 152 is selected for data transfer, the selected external wireless access point 152 accesses the data from the off-board server 140. This data is then accessible to the internal wireless network 118 via circuit 156 of at least one light 150. FIG. 3 describes data transfer between an off-board server 140 and on-board server 130.

As shown in FIG. 3, internal wireless access points 154-1, 154-2, 154-3, 154-4, 154-5 and 154-6 form the internal wireless network 118 and external wireless access points 152-1, 152-2, 152-3, 152-4, 152-5 and 152-6 form the external wireless network 115. In the example shown in FIG. 3, the data from off-board server 140 is accessible to external wireless access point 152-6. In exemplary embodiments, the data is accessible to internal wireless access point 154-6 corresponding to light 150-6, and the data is then transferred to the on-board server 130 through the internal wireless network 118 using the remaining internal wireless access points 154. For example, in the example shown in FIG. 3, external wireless access point 152-6 is selected for data transfer by off-board server 140. This external wireless access point 152-6 accesses the data from the off-board server 140. The data is accessible to the internal wireless access point 154-6 and is then transferred to internal wireless access point 154-1 corresponding to light 150-1 connected to on-board server 130. Accordingly, the data is transferred to on-board server 130 through the internal wireless network 118. In such an example, each of the internal wireless access points 154 of the internal wireless network 118 acts as a Wi-Fi client and gets connected to the on-board server.

In exemplary embodiments, the data is transferred to an internal wireless access point 154 that is connected to the on-board server 130 through the external wireless network 115. For example, as shown in FIG. 1, in such an example, external wireless access point 152-6 corresponding with light 150-6 is selected for data transfer by off-board server 140. This external wireless access point 152-6 accesses the data from the off-board server 140 and transfers it to external wireless access point 152-1 corresponding to light 150-1 through the external wireless network 115. This data is accessible to internal wireless access point 154-1 via circuit 156-1 corresponding to light 150-1. The on-board server 130 that is connected with internal wireless access point 154 corresponding to light 150-1 is then able to access this data. Accordingly, in such an example, the data is transferred to the on-board server 130 through the external wireless network 115. In such an example, each of the external wireless access points 152 of the external wireless network 115 acts as a Wi-Fi client and gets connected to the off-board server. In exemplary embodiments, the external wireless access points 152 of the external wireless network 115 may have other wireless communication capabilities such as Bluetooth, Zigbee, etc.

Similarly, to transfer data from the on-board server 130 to off-board server 140, the data is transferred using at least one of the external wireless network 115 or the internal wireless network 118. That is, the internal wireless access point 154-1 connected to on-board server 130 accesses the data from the on-board server 130. In an exemplary embodiment, internal wireless access point 154-1 then transfers the data to an external wireless access point 152-1 via circuit 156-1. In such an example, the external wireless access point 152-1 then transfers the data to external wireless access point 152-6 connected to off-board server 140 via external wireless network 115. The off-board server 140 is then able to access the data from the external wireless access point 152-1. Accordingly, in such an example, the data is transferred from the on-board server 130 to off-board server 140 through external network 115.

In an exemplary embodiment, internal wireless access point 154-1 transfers the data to internal wireless access point 154-6 through internal network 118. External wireless access point 152-6 connected to off-board server 140 is then able to access this data via circuit 156-6. The off-board server can access the data from the external wireless access point 152-6. Accordingly, in such an example, the data is transferred from the on-board server 130 to off-board server 140 through internal wireless network 118.

In exemplary embodiments, after selecting the external wireless access point 152-6 for data transfer and before the data is transferred from the off-board server 140 to the on-board server 130, a message is displayed to the operator (such as, a pilot) for authorization to connect off-board server 140 to the on-board server 130. Upon validation or authorization, the data is transferred from off-board server 140 to on-board server 130. In further exemplary embodiments, upon validation from the operator the data is transferred from on-board server 130 to the avionics that are connected to on-board server 130. In exemplary embodiments, the level of security for validation is based on the type of data being transferred to on-board server 130. For example, security requirements for validation of entertainment related data may not be as stringent as requirements for critical avionics data and software upgrades.

Similarly, in exemplary embodiments, before the data is transferred from the on-board server 130 to the off-board server 140, a message is displayed to a user accessing off-board server 140 to connect on-board server 130 to off-board server 140. Upon authorization, the data is transferred from on-board server 130 to off-board server 140. In exemplary embodiments, the authorization is based on the vehicle registration of vehicle 102.

FIG. 4 is a flow diagram of an example method 400 of fabricating a seamless wireless network, such as a system 100, for transferring data between an off-board server, such as off-board server 140 and an on-board server, such as an on-board server 130. It should be understood that method 400 may be implemented in conjunction with any of the various embodiments and implementations described in this disclosure above or below. As such, elements of method 400 may be used in conjunction with, in combination with, or substituted for elements of those embodiments. Further, the functions, structures and other description of elements for such embodiments described herein may apply to like named elements of method 400 and vice versa. Further, the example flow diagram is provided as an ordered sequence of steps. Other sequences are possible. Hence, embodiments are not limited to the order of sequence provided in FIG. 4.

Example method 400 begins at block 402 with mounting at least one light, such as light 150 to the exterior, such as exterior 175 of a vehicle, such as vehicle 102. In exemplary embodiments, mounting at least one light to the exterior of the vehicle further comprises mounting a plurality of lights to the exterior of the vehicle. In exemplary embodiments of method 400, the vehicle is an aircraft. In exemplary embodiments, the at least one light further comprises a cover element composed of a non-metallic element. In further exemplary embodiments, the cover element is composed of at least one of polycarbonate and glass material.

Example method 400 then proceeds to block 404 with forming an external network, such as an external network 115, by positioning at least one external wireless access point, such as an external wireless access point 152 on the exterior of a vehicle at the same location as the at least one light. The at least one external wireless access point further comprises a first antenna, such as 162. The external wireless access point is configured to connect to at least one off-board server, such as off-board server 140.

Example method 400 then proceeds to block 406 with forming an internal network by positioning at least one internal wireless access point, such as internal wireless access point 154, on the interior of the vehicle at the same location as the at least one light. The at least one internal wireless access point further comprises of a second antenna, such as 164, to connect to an on-board server, such as an on-board server 130 of the vehicle.

In an exemplary method 400 with a plurality of lights, an external wireless access point is positioned at the location of each of the plurality of lights and all of the external wireless access points form the external network 115, and an internal wireless access point is positioned at the location of each of the plurality of lights and all of the internal wireless access points form the internal network 118. In such an example, the off-board server is configured to automatically connect to one of the at least one external wireless access point based on signal strength between the at least one external wireless access point and the off-board server. In exemplary embodiments, the off-board server is a ground station. In exemplary embodiments, the external wireless access points and the internal wireless access points have Wi-Fi, Bluetooth, Zigbee or other proprietary or non-proprietary wireless communication capabilities or protocols.

Example method 400 finally proceeds to block 408 with coupling a circuit, such as circuit 156, to the at least one external wireless access point and to the at least one internal wireless access point for bidirectional transfer of data between the at least one external wireless access point and the at least one internal wireless access point. In exemplary embodiments of method 400, the circuit is a shared memory that is accessible to the external wireless access point and the internal wireless access point.

FIG. 5 is a flow diagram of an example method 500 of transferring data between an off-board server, such as off-board server 140 and an on-board server, such as an on-board server 130 of a vehicle, such as vehicle 102. It should be understood that method 500 may be implemented in conjunction with any of the various embodiments and implementations described in this disclosure above or below. As such, elements of method 500 may be used in conjunction with, in combination with, or substituted for elements of those embodiments. Further, the functions, structures and other description of elements for such embodiments described herein may apply to like named elements of method 500 and vice versa. Further, the example flow diagram is provided as an ordered sequence of steps. Other sequences are possible. Hence, embodiments are not limited to the order of sequence provided in FIG. 5.

FIG. 5 begins at block 502 with selecting one of a plurality of external wireless access points, such as external wireless access points 152-6 to connect with the off-board server, such as off-board server 140. In exemplary embodiments, selecting one of a plurality of external wireless access points to connect with the off-board server is based on quality of wireless connection (for example, signal strength).

Method 500 then proceeds to block 504 to determine if the data is received from the off-board server. In exemplary embodiments, when it is determined that the data is to be received from the off-board server, method 500 further comprises displaying a message to a user of the on-board server for authorization to connect the off-board server and the on-board server for data transfer (505). In such an example, method 500 proceeds to block 506 upon receiving authorization from the on-board server to connect the off-board server with the on-board server. In such an example, if valid authorization is not received, method 500 proceeds to block 520 with denying access to the data. When receiving data from the off-board server, method 500 proceeds to block 506 with accessing data from the off-board server through the selected external wireless access point. In exemplary embodiments, method 500 comprises displaying a message to a user of the on-board server for authorization to connect the off-board serve and the on-board server for data transfer when it is determined that the data is to be transferred to the off-board server.

Method 500 then proceeds to block 508 with transferring the data to an internal wireless access point, such as internal wireless access point 154-1 connected to the on-board server, such as on-board server 130. In one exemplary embodiment, the data is transferred to an internal wireless access point by first transferring the data to at least a second of the plurality of external wireless access points, such as an external wireless access point 152-5, and then transferring the data from the at least a second of the plurality of external wireless access points to the internal wireless access point connected to the on-board server.

In another exemplary embodiment, the data is transferred to an internal wireless access point by first transferring the data to at least a second internal wireless access point, such as internal wireless access point 154-6, and then transferring the data from the second internal wireless access point to the internal wireless access point, such as 154-1, connected to the on-board server. In such an example, the second internal wireless access point is different from the internal wireless access point connected to the on-board server. Method 500 then proceeds to block 510 with transferring data from the internal wireless access point to the on-board server.

When method 500 determines, at block 504, that data is being transferred to the off-board server, method 500 proceeds to block 514 with receiving data from an on-board server at an internal wireless access point. In exemplary embodiments, when it is determined that the data is to be transferred to the off-board server, method 500 further comprises displaying a message to a user of the off-board server for authorization to connect the off-board server and the on-board server for data transfer (513). In such an example, method 500 proceeds to block 514 upon receiving authorization from the off-board server to connect the off-board server with the on-board server. In such an example, if valid authorization is not received, method 500 proceeds to block 522 with denying access to the data. In exemplary embodiments, method 500 comprises displaying a message to a user of the off-board server for authorization to connect the off-board serve and the on-board server for data transfer when it is determined that the data is to be transferred to the on-board server.

Method 500 then proceeds to block 516 with transferring the data from the internal wireless access point, such as internal wireless access point 154-1 to the selected external wireless access point, such as selected external wireless access point 152-6. In one exemplary embodiment of method 500, the data is transferred from the internal wireless access point to the selected external wireless access point by transferring the data from the internal wireless access point to at least a second internal wireless access point, such as internal wireless access point 154-6, and transferring the data from the second internal wireless access point to the selected external wireless access point.

In another exemplary embodiment of method 500, the data is transferred from the internal wireless access point to the selected external wireless access point by transferring the data from the internal wireless access point to a second external wireless access point, such as external wireless access point 152-1, of the plurality of external wireless access points, and transferring the data from the second external wireless access point to the selected external wireless access point. Finally, method 500 proceeds to block 518 with transferring the data from the selected external wireless access point to the off-board server.

In accordance with common practice, the various described features are not drawn to scale but are drawn to emphasize specific features relevant to the exemplary embodiment.

EXEMPLARY EMBODIMENTS

Example 1 includes a system for transferring data between an on-board server and an off-board server of a vehicle, the system comprising: at least one light mounted to an exterior of a vehicle; an external network comprising at least one external wireless access point, wherein the at least one external wireless access point comprises a first antenna, and wherein the first antenna is positioned on the exterior of the vehicle at the location of the at least one light, wherein the external network is configured to automatically connect to an off-board server, wherein the off-board server is located outside the vehicle; an internal network comprising at least one internal wireless access point, wherein the at least one internal wireless access point comprises a second antenna, and wherein the second antenna is positioned on the interior of the vehicle at the location of the at least one light, wherein the internal network is configured to automatically connect to an on-board server, wherein the on-board server is internal to the vehicle; a circuit coupled to the at least one external wireless access point and to the at least one internal wireless access point, wherein the circuit is configured to transfer data bi-directionally between the off-board server and the on-board server.

Example 2 includes the system of Example 1, wherein: the at least one light mounted to an exterior of a vehicle comprises a plurality of lights mounted to the exterior of the vehicle; and each of the plurality of lights comprises one of the at least one external wireless access point such that the external network is formed between the external wireless access points of each of the plurality of lights.

Example 3 includes the system of Example 2, wherein each of the plurality of lights comprises one of the at least one internal wireless access point such that the internal network is formed between the internal wireless access points of each of the plurality of lights.

Example 4 includes the system of any of Examples 2-3, wherein the off-board server is configured to automatically connect to one of the at least one external wireless access point based on signal strength between the at least one external wireless access point and the off-board server.

Example 5 includes the system of any of Examples 1-4, wherein the vehicle is an aircraft.

Example 6 includes the system of any of Examples 1-5, wherein the circuit coupled to the at least one external wireless access point and to the at least one internal wireless access point is a shared memory.

Example 7 includes the system of any of Examples 1-6, wherein the off-board server is a ground station.

Example 8 includes the system of any of Examples 1-7, wherein the at least one external wireless access point and the at least one internal wireless access point have at least one of Wi-Fi, Bluetooth, and Zigbee capabilities.

Example 9 includes the system of any of Examples 1-8, wherein the at least one light further comprises a cover element composed of a non-metallic element.

Example 10 includes a method of providing a seamless wireless network for transferring data between an off-board server and an on-board server of a vehicle comprising: mounting at least one light to the exterior of a vehicle; forming an external network by positioning at least one external wireless access point on the exterior of a vehicle at the same location as the at least one light, wherein the at least one external wireless access point further comprises a first antenna, wherein the at least one external wireless access point is configured to connect to an off-board server; forming an internal network by positioning at least one internal wireless access point comprising a second antenna on the interior of the vehicle at the same location as the at least one light, wherein the internal wireless access point is configured to connect to an on-board server of the vehicle; coupling a circuit to the at least one external wireless access point and the at least one internal wireless access point wherein the circuit is configured to bidirectionally transfer data between the at least one external wireless access point and the at least one internal wireless access point.

Example 11 includes the method of Example 10, wherein: mounting at least one light to an exterior of a vehicle further comprises mounting a plurality of lights to the exterior of the vehicle; forming an external network by positioning at least one external wireless access point on the exterior of a vehicle at the same location as the at least one light comprises positioning at least one external wireless access point on the exterior of a vehicle at the location of each light of the plurality of lights, wherein the external network is formed between the external wireless access points of each of the plurality of lights; and forming an internal network by positioning at least one internal wireless access point further comprise positioning at least one internal wireless access point on the interior of the vehicle at the location of each light of the plurality of lights, wherein the internal network is formed between the internal wireless access points of each of the plurality of lights.

Example 12 includes the method of Example 11, wherein the off-board server is configured to automatically connect to one of the at least one external wireless access point based on signal strength between the at least one external wireless access point and the off-board server.

Example 13 includes the method of any of Examples 10-12, wherein the vehicle is an aircraft.

Example 14 includes the method of any of Examples 10-13, wherein the circuit coupled to the at least one external wireless access point and the at least one internal wireless access point is a shared memory.

Example 15 includes the method of any of Examples 10-14, wherein the off-board server is a ground station.

Example 16 includes the method of any of Examples 10-15, wherein the at least one external wireless access point and the at least one internal wireless access point have at least one of Wi-Fi, Bluetooth, and Zigbee capabilities.

Example 17 includes a method of transferring data between an on-board server of a vehicle and an off-board server, the method comprising: selecting one of a plurality of external wireless access points to connect with the off-board server; when receiving data from the off-board server: accessing data from the off-board server through the selected external wireless access point; transferring the data to an internal wireless access point connected to the on-board server; and transferring data from the internal wireless access point to the on-board server; when transferring data to the off-board server: receiving data from an on-board server at an internal wireless access point; transferring the data from the internal wireless access point to the selected external wireless access point; and transferring the data from the selected external wireless access point to the off-board server.

Example 18 includes the method of Example 17, wherein transferring the data to an internal wireless access point connected to the on-board server comprises at least one of: transferring the data to at least a second of the plurality of external wireless access points and transferring the data from the at least a second of the plurality of external wireless access points to the internal wireless access point connect to the on-board server; and transferring the data to at least a second internal wireless access point, wherein the second internal wireless access point is different from the internal wireless access point connected to the on-board server, and transferring the data from the second internal wireless access point to the wireless access point connected to the on-board server.

Example 19 includes the method of any of Examples 17-18, wherein transferring the data from the internal wireless access point to the selected external wireless access point comprises at least one of: transferring the data from the internal wireless access point to at least a second internal wireless access point, wherein the second internal wireless access point is different from the internal wireless access point connected to the on-board server, and transferring the data from the second internal wireless access point to the selected external wireless access point; and transferring the data from the internal wireless access point to a second external wireless access point of the plurality of external wireless access points, and transferring the data from the second external wireless access point to the selected external wireless access point.

Example 20 includes the method of any of Examples 17-19, further comprising: displaying a message to a user of the on-board server for authorization to connect the off-board server and the on-board server when a request to at least one of transfer data to the on-board server and receive data from the on-board server is received from the off-board server; and displaying a message to a user of the off-board server for authorization to connect the on-board server and the off-board server when a request to at least one of transfer data to the off-board server and receive data from the off-board server is received from the on-board server.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system for transferring data between an on-board server and an off-board server of a vehicle, the system comprising:
   a plurality of lights mounted to an exterior surface of a vehicle at a plurality of locations;
   an external network comprising a plurality of external wireless access points, the plurality of external wireless access points each including a first antenna, each of the first antenna being positioned on the exterior surface of the vehicle at one of the plurality of locations of the plurality of lights, the external network being configured to automatically connect to an off-board server, the off-board server being located outside the vehicle;
   an internal network comprising a plurality of internal wireless access points, the plurality of internal wireless access points each including a second antenna, each of the second antenna being positioned on an interior surface of the vehicle corresponding to a corresponding one of the plurality of locations of the plurality of lights, the internal network being configured to automatically connect to an on-board server, the on-board server being internal to the vehicle; and
   a plurality of circuits, each of the plurality circuits being coupled to an external wireless access point of the plurality of external wireless access points and an internal wireless access point of the plurality of internal wireless access points, the circuit being configured to transfer data bi-directionally between the off-board server and the on-board server through the external wireless access point and the internal wireless access point,
   wherein the data is transferred between the off-board server and the on-board server via: a selected external wireless access point connected to the off-board server, the external network, and an internal wireless access point, of the plurality of internal wireless access points, connected to the on-board server.

2. The system of claim 1, wherein the off-board server is configured to automatically connect to an external wireless access point of the plurality of external wireless access points based on signal strength between the external wireless access point and the off-board server.

3. The system of claim 1, wherein the vehicle is an aircraft.

4. The system of claim 1, wherein the plurality of circuits are a shared memory for their corresponding external wireless access point and internal wireless access point.

5. The system of claim 1, wherein the off-board server is a ground station.

6. The system of claim 1, wherein the plurality of external wireless access points and the plurality of internal wireless access points have at least one of Wi-Fi, Bluetooth, and Zigbee capabilities.

7. The system of claim 1, wherein the plurality of lights each further comprise a cover element composed of a non-metallic element.

8. A method of transferring data between an on-board server of a vehicle and an off-board server, the method comprising:
   selecting one of a plurality of external wireless access points to connect with the off-board server, the plurality of external wireless access points corresponding to a plurality of internal access points, each of the plurality of external wireless access points including a first antenna, the first antenna of each of the plurality of external wireless access points being positioned on an exterior surface of the vehicle at a location of one of a plurality of lights, each of the plurality of internal access points including a second antenna, the second antenna of each of the plurality of internal wireless access points being positioned on an interior surface of the vehicle corresponding to the location of one of the plurality of lights;
   when receiving first data from the off-board server:
      accessing the first data from the off-board server through the selected external wireless access point;
      transferring the first data to an internal wireless access point, of the plurality of internal wireless access points, connected to the on-board server by transferring the first data to a second of the plurality of external wireless access points and transferring the first data from the second of the plurality of external wireless access points to the internal wireless access point connected to the on-board server; and transferring the first data from the internal wireless access point to the on-board server;

when transferring second data to the off-board server:
receiving the second data from the on-board server at the internal wireless access point;
transferring the second data from the internal wireless access point to the selected external wireless access point by transferring the second data from the internal wireless access point to a second external wireless access point of the plurality of external wireless access points, and transferring the second data from the second external wireless access point to the selected external wireless access point; and
transferring the second data from the selected external wireless access point to the off-board server.

9. The method of claim 8, further comprising:
displaying a message to a user of the on-board server for authorization to connect the off-board server and the on-board server when a request to at least one of transfer data to the on-board server and receive data from the on-board server is received from the off-board server; and
displaying a message to a user of the off-board server for authorization to connect the on-board server and the off-board server when a request to at least one of transfer data to the off-board server and receive data from the off-board server is received from the on-board server.

* * * * *